(12) United States Patent
Twerdochlib et al.

(10) Patent No.: US 7,775,114 B2
(45) Date of Patent: Aug. 17, 2010

(54) METHOD OF ON-LINE TURBINE BLADE SLOPE AND SENSOR POSITION VERIFICATION

(75) Inventors: Michael Twerdochlib, Oviedo, FL (US); John F. DeMartini, Lake Mary, FL (US)

(73) Assignee: Siemens Energy, Inc., Orlando, FL (US)

( * ) Notice: Subject to any disclaimer, the term of this patent is extended or adjusted under 35 U.S.C. 154(b) by 255 days.

(21) Appl. No.: 11/861,532

(22) Filed: Sep. 26, 2007

(65) Prior Publication Data

US 2009/0078051 A1 Mar. 26, 2009

(51) Int. Cl.
*G01N 29/00* (2006.01)
(52) U.S. Cl. .............................. 73/660; 73/584; 73/593; 73/649
(58) Field of Classification Search .................. 73/660, 73/584, 593, 629, 579, 583, 627, 662, 624, 73/649
See application file for complete search history.

(56) References Cited

U.S. PATENT DOCUMENTS

| | | | |
|---|---|---|---|
| 4,887,468 A | | 12/1989 | McKendree et al. |
| 4,907,456 A | | 3/1990 | Rozelle |
| 4,934,192 A | * | 6/1990 | Jenkins ......................... 73/660 |
| 5,097,711 A | * | 3/1992 | Rozelle et al. ................. 73/660 |
| 5,445,027 A | * | 8/1995 | Zorner ......................... 73/593 |
| 5,974,882 A | * | 11/1999 | Heath .......................... 73/579 |
| 6,668,651 B2 | * | 12/2003 | Beausseroy et al. ........... 73/579 |

* cited by examiner

*Primary Examiner*—J M Saint Surin

(57) ABSTRACT

A method of monitoring vibrations in a blade structure of a turbine including generating signals from a sensor located adjacent to a radial outer edge of the blade structure to sense passage of targets located on the blade structure. The sensor is mounted eccentrically and the signals are obtained with the sensor located at different angular positions. In a first aspect of the invention, the signals from the sensor are used to determine a target slope angle of a target on a first turbine blade during operation of the turbine. In a second aspect of the invention, the signals from the sensor are used to position the sensor in response to a sensed variation in the axial position of the target on the first turbine blade.

18 Claims, 5 Drawing Sheets

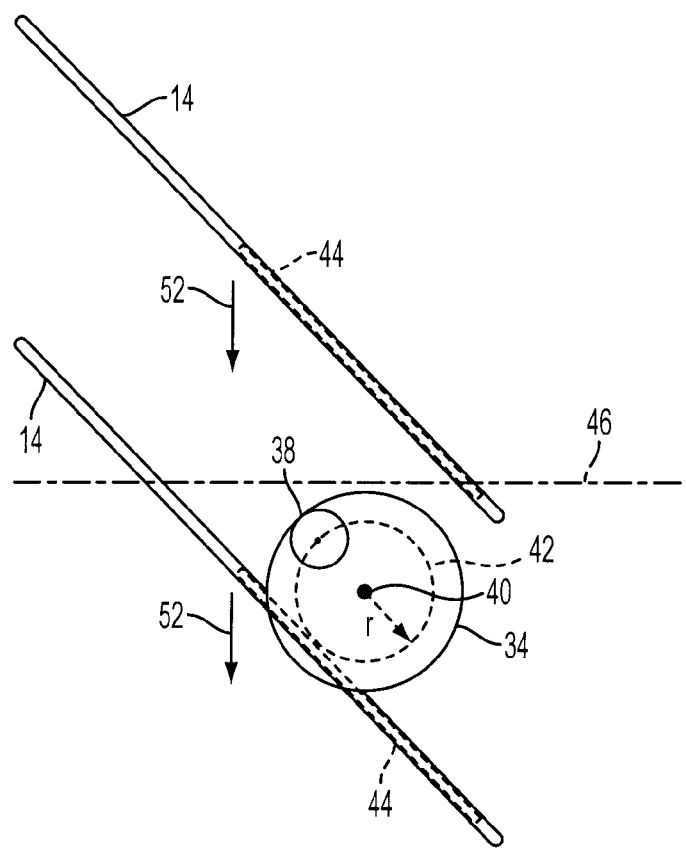
FIG. 2
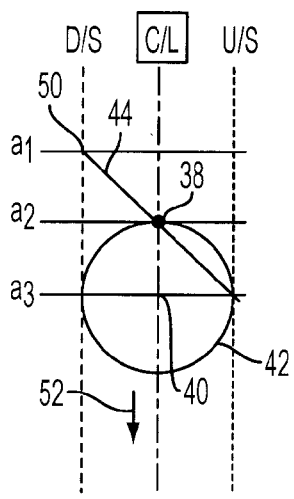
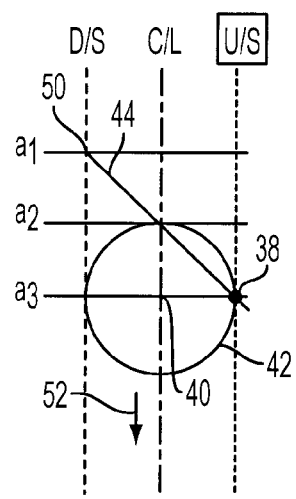
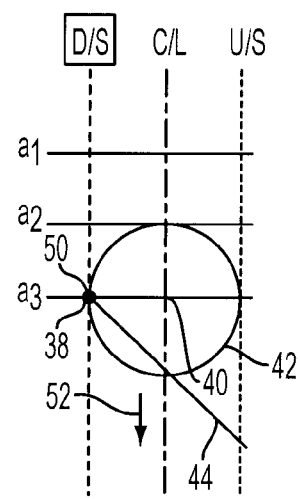
FIG. 3A  FIG. 3B  FIG. 3C

METHOD OF ON-LINE TURBINE BLADE SLOPE AND SENSOR POSITION VERIFICATION

FIELD OF THE INVENTION

The present invention relates to a method of monitoring a blade structure in a turbine and, more particularly, to a method of measuring a blade target slope and positioning a sensor to optimize detection of target passing events for a blade vibration monitoring system.

BACKGROUND OF THE INVENTION

A high speed turbo machine, such as, for example, a steam or gas turbine, generally comprises a plurality of blades arranged in axially oriented rows, the rows of blades being rotated in response to the force of a high pressure fluid flowing axially through the machine. Due to their complex design, natural resonant mechanical frequencies of the blades may coincide with or be excited by certain blade rotational speeds and rotational harmonics thereof. To prevent excessive vibration of the blade about its normal position, prudent design practice dictates that the blades be constructed such that the frequencies of the lowest modes fall between harmonics of the operating frequency of the turbine. In addition, the blades may be excited by non-synchronous forces such as aerodynamic buffeting or flutter. In order to avoid the vibration exceeding certain levels and setting up objectionable stresses in the blades, it is common to monitor the vibrations of the blades, both during the design and testing of the turbine and during normal operation of the turbine. For example, it is known to use non-contacting proximity sensors or probes to detect blade vibrations. The probes detect the actual time-of-arrival of each blade as it passes each probe and provide corresponding signals to a blade vibration monitor system (BVM). Small deviations due to vibration are extracted, from which the BVM may determine the amplitude, frequency, and phase of the vibration of each blade.

The measured vibration amplitude is highly dependent on correct positioning of the sensor above the blade target, which may comprise a target affixed to the blade or a feature of the blade. Although every effort is made to ensure that the installation of the sensors on the cold casing of the turbine locates the sensors over the targets in the hot running state, it is still necessary to install redundant sets of sensors located at different axial positions to ensure that at least one set is correctly positioned and usable when the turbine is operating. For example, in a known construction for steam turbine blades, the target strip at the end of the blades may be approximately 1.5 inches long, but the target is oriented at a small cant angle relative to the plane of the blade row such that the target extends only about 0.5 inches in the axial direction. As the turbine heats to its operating temperature, the blades and associated targets shift axially with thermal expansion of the rotor and casing, and it is necessary to accurately predict and locate the sensor over the relatively narrow axial extent of the target strip at the heated operating temperature of the turbine.

The installation of additional sensors has proven to be costly and time consuming. In addition, it has been found that it is not necessarily possible to determine the validity of a sensor position by examination of the signal produced by the sensor, unless the positioning of the sensor is extremely poor, such as off the target. A poorly positioned sensor producing an apparently valid signal can result in invalid or poor data being provided to the BVM and an incorrect analysis of the blade vibration reading.

Accordingly, there is a need for a method of determining that a sensor is correctly positioned to provide valid sensor signals in response to target passing events.

SUMMARY OF THE INVENTION

In accordance with one aspect of the invention, a method is provided for monitoring a blade structure in a turbine comprising a plurality of radially extending blades mounted on a rotor for rotation about a rotational axis, the blade structure including at least one target portion located at a radially outer location of the blade structure. The method comprises the steps of providing a sensor adjacent the blade structure, positioning the sensor at a first location adjacent the blade structure, generating a first signal corresponding to a first target passing event sensed by the sensor at the first location, positioning the sensor at a second location adjacent the blade structure a known displacement from the first location, generating a second signal corresponding to a second target passing event sensed by the sensor at the second location, and producing target slope data from the first and second signals and the known displacement of the sensor. The target slope data may comprise an angle of the at least one target portion relative to a blade plane extending perpendicular to the rotational axis of the rotor.

In accordance with another aspect of the invention, a method is provided for positioning a blade vibration monitor sensor for monitoring a blade structure in a turbine comprising a plurality of radially extending blades mounted on a rotor for rotation about a rotational axis, the blade structure including at least one target portion located at a radially outer location of the blade structure. The method comprises the steps of providing a sensor adjacent the blade structure, moving the sensor between first and second locations relative to the blade structure, sensing first and second target passing events corresponding to the at least one target passing the sensor at the first and second locations, generating first and second signals corresponding to the first and second target passing events, respectively, and compensating for axial displacement of the blade during operation of the turbine by monitoring the second signal and moving the sensor to maintain the second signal within a preset range of the first signal.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

FIG. 2 is a diagrammatic view taken radially inwardly from an outer edge of a portion of the blade structure for the turbine;

FIGS. 3A, 3B and 3C are diagrammatic illustrations of a sensor probe structure showing alternative positions of a sensor along a sensor circle relative to a target on a blade;

DETAILED DESCRIPTION OF THE INVENTION

In the following detailed description of the preferred embodiment, reference is made to the accompanying drawings that form a part hereof and in which is shown by way of illustration, and not by way of limitation, a specific preferred embodiment in which the invention may be practiced. It is to be understood that other embodiments may be utilized and that changes may be made without departing from the spirit and scope of the present invention.

Figure 1:
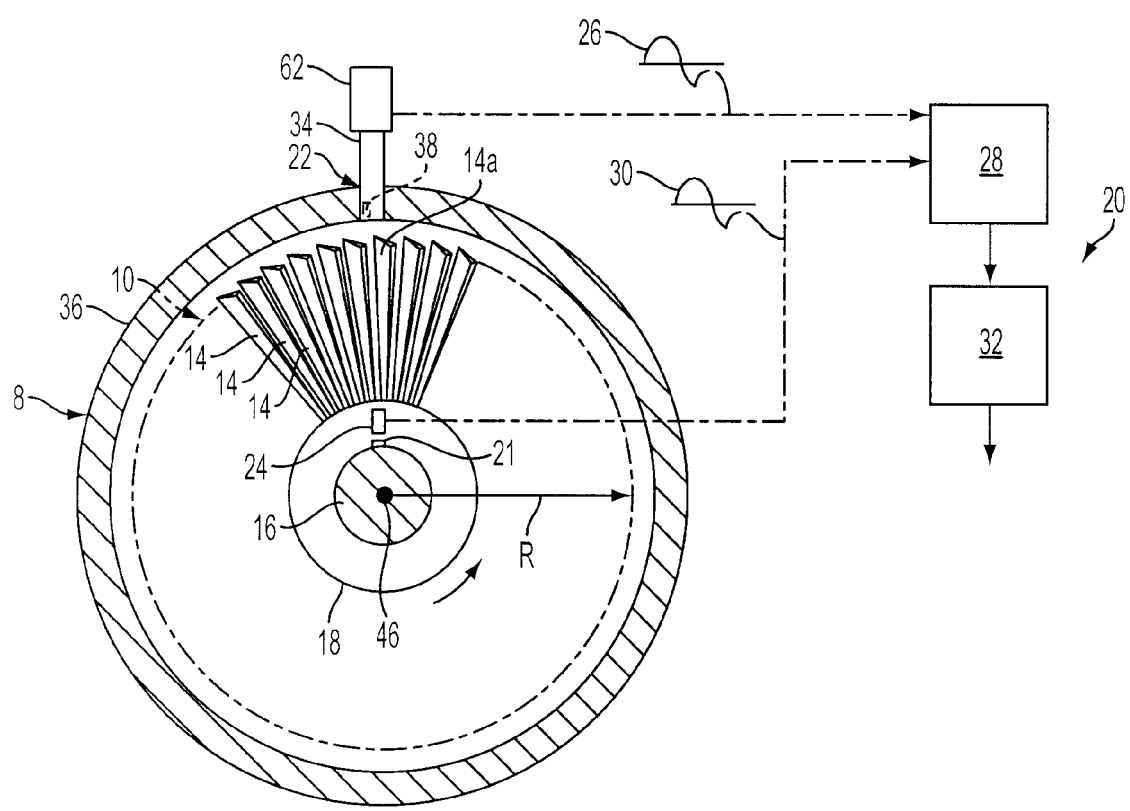
FIG. 1 is a diagrammatic view illustrating a turbine and a blade vibration monitor system for performing the present invention.

FIG. 1 diagrammatically illustrates a turbine 8 including an unshrouded turbine blade row 10 in which the method of the present invention can be employed in a blade vibration monitoring system to monitor nonsynchronous turbine blade vibrations. Turbine blades 14 are connected to a rotor 16 by means of a rotor disk 18.

A nonsynchronous turbine blade vibration monitoring system (BVM) 20 is also shown in FIG. 1. The system 20 includes a turbine blade probe sensor structure 22 for monitoring the vibration of the turbine blades 14. It should be understood that although only one probe sensor structure 22 is described herein with reference to the present invention, plural probe sensor structures 22 may be provided in circumferentially spaced relation to each other.

As further illustrated in FIG. 1, a reference sensor 24 is additionally provided. The reference sensor 24, in conjunction with an indicia 21 on the rotor 16, is operable to provide a once-per-revolution (OPR) reference pulse signal 30. The production of such a reference signal is commonly known in the turbine art.

Input signals 26 from the probe sensor structure 22 are provided as inputs to a blade vibration processor 28. The signal 30 from reference sensor 24 is additionally provided as an input to the blade vibration processor 28. The output of the blade vibration processor 28 is input to a signal analyzer 32 which may perform signal conditioning and analysis.

Referring to FIGS. 1 and 2, the probe sensor structure 22 may comprise a probe 34 for extending through a casing or wall portion 36 of the turbine 8. The probe 34 supports a sensor 38 in eccentric relation to a probe rotational axis 40 about which the probe 34 may be rotated. The sensor 38, i.e., the center of the sensor 38, is spaced from the rotational axis 40 a known distance or radius, r, such that rotation of the probe 34 about the axis 40 permits the sensor 38 to track a sensor circle 42 for selectively positioning the sensor 38 relative to the blades 14, as will be described further below. In a preferred embodiment of the present invention, the radius, r, may be approximately 0.2 inch.

The mounting of the probe sensor structure 22 through the wall portion 36 of the turbine 8 may be provided in a conventional manner, such as is described, for example, in U.S. Pat. No. 4,887,469, which patent is hereby incorporated by reference. The sensor 38 may be a variable reluctance sensor, i.e., a magnetic reluctance sensor, or may incorporate any practical method of sensing a blade or target passing event including, but not limited to, microwave or optical methods.

The sensor 38 produces a pulse at each target passing event comprising the passage of a blade target 44 in a path adjacent the sensor 38 as the blades 14 rotate about a rotational or rotor axis 46 of the turbine rotor 16. It should be understood that the blade target 44 may be defined by a separate element detected by the sensor 38, by a surface feature on the blades 14 such as slots or notches, or may be defined by an edge of the blade tip. In addition, the present invention may be performed with a blade structure comprising a shrouded blade row (not shown) in which a target 44 may be provided for each blade location of the shrouded blade structure.

Variations in the measured vibration amplitude, frequency and phase of each of the blades 14 is detected by a measurement of the passage of the target 44 relative to the detected OPR reference signal 30 from the sensor 24, and may be specified in terms of an angle of rotation of the rotor 16 from the detection of the reference signal 30 to the target passing event corresponding to the sensor 38 producing an input signal 26. In accordance with the present invention, a first target angle (FTA) is defined as the angle of rotation between the reference signal 30 produced by the OPR reference sensor 24 and the first input signal 36 from a first blade 14a, see FIG. 1, passing the sensor 38 following the OPR event described above. The BVM 20 is capable of making very accurate measurements of the FTA, typically to an accuracy of within approximately 0.005 degrees. The FTA is used in accordance with the present method to determine a change in the location of the sensor 38 detecting a target passing event as the rotor 16 and blades 14 shift axially, such as may occur due to thermal shifting of the rotor 16 with changes in temperature within the turbine 8. Specifically, the BVM 20 uses high precession time of arrival techniques to detect a change in the FTA from the input signals 26.

Figure 4A:
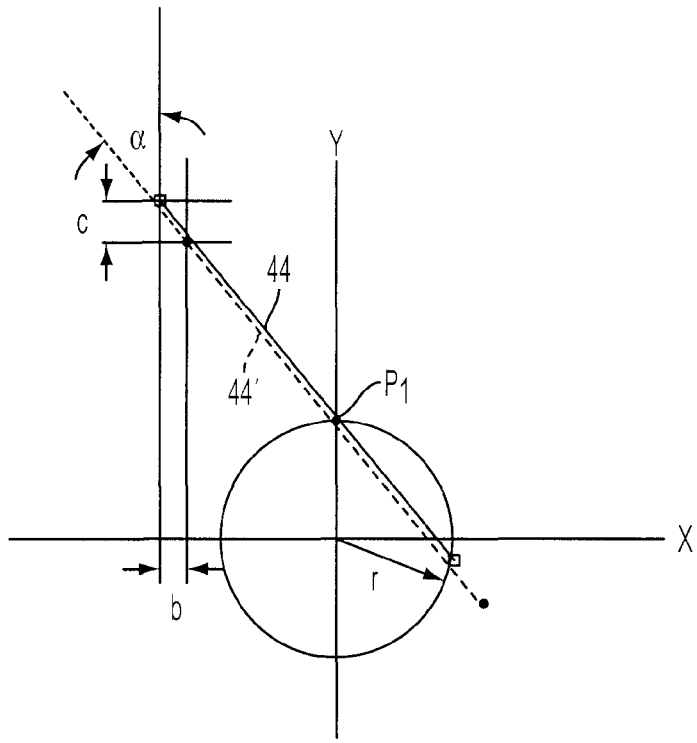
FIGS. 4A and 4B are diagrammatic views illustrating the geometric relationship between the position of the sensor along the sensor circle and the target slope angle.
Figure 4B:
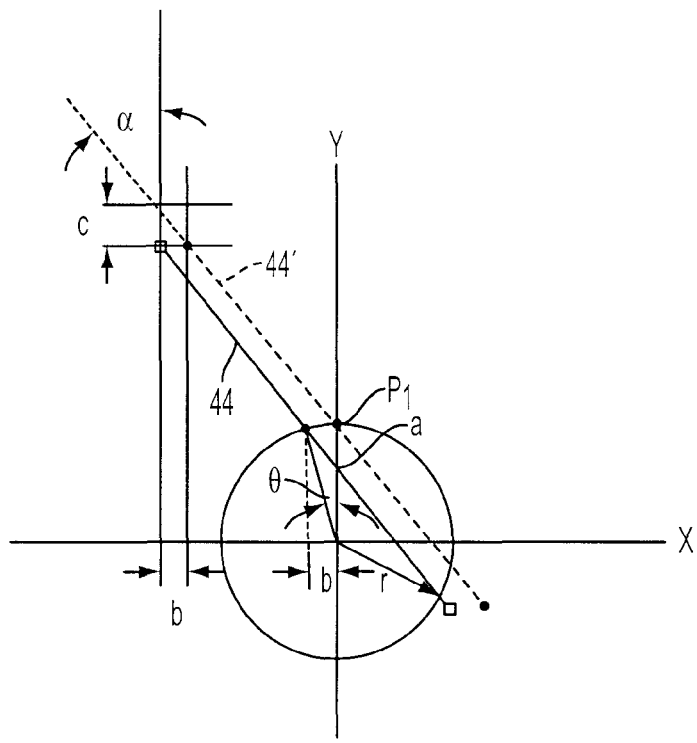

Referring to FIGS. 2, 4A and 4B, as is well known in the art, the turbine blades 14 are mounted on the rotor disk 18 at an angle relative to the rotor axis 46. Hence, the target 44 is oriented at a target slope angle, $\alpha$, relative to the blade row plane defined as a plane extending in the direction of movement, 52, of the blade 14a, perpendicular to a line, x, extending parallel to the rotor axis 46, see FIGS. 4A and 4B.

A change in the FTA due to a relative shift in the axial position between the sensor 38 and the target 44 is related to the target slope angle, $\alpha$. This can be seen in FIGS. 3A, 3B and 3C where the sensor 38 is depicted in three different axial positions (and hence different positions on the sensor circle 42) provided by rotation of the probe 34 about the probe rotational axis 40. In particular, FIG. 3A depicts the sensor 38 positioned at a center-line (C/L) position, FIG. 3B depicts the sensor 38 positioned at an upstream (U/S) position, and FIG. 3C depicts the sensor 38 positioned at a downstream (D/S) position. The target 44 is depicted as having passed through successive angular increments $a_1$, $a_2$ and $a_3$ as it moves with blade travel in the direction of arrow 52 in each of FIGS. 3A-C. For the purposes of comparing the blade position in FIGS. 3A-C, the first target angle, FTA, may be considered with reference to the location of a trailing edge 50 of the target 44 at the time the target 44 passes the sensor 38 to generate a signal 26. When the sensor 38 is located at the center-line position (C/L), the signal 26 provided from the sensor 38 corresponds to travel of the trailing edge 50 of the first blade 14a through a first target angle, FTA, of $a_1$, as seen in FIG. 3A. When the sensor 38 is located at the upstream position (U/S), the signal 26 provided from the sensor 38 corresponds to travel of the trailing edge 50 of the first blade 14a through a first target angle, FTA, of $a_1$, as seen in FIG. 3B. When the sensor 38 is located at the downstream position (D/S), the signal 26 provided from the sensor 38 corresponds to travel of the trailing edge 50 of the first blade 14a through a first target angle, FTA, of $a_3$, as seen in FIG. 3C. Hence, both the centerline and the upstream positions of the sensor provide a signal 38 that corresponds to travel of the trailing edge 50 through a first target angle, FTA, equal to $a_1$ that is earlier than the FTA $a_3$ corresponding to the signal 26 produced by locating the sensor 38 at the downstream position. Accordingly, it can be seen that the sensor 38 may be positioned so as to have an effect on the detected angle of the target passing event relative to the rotation position of the rotor 16. In addition, FIGS. 3A-C illustrate that the sensor position may be selected to determine the area of the target 44 that passes adjacent to the sensor 38 to trigger a target passing event.

FIGS. 4A and 4B illustrate the geometric relationship between the position of the sensor 38 along the sensor circle 42 and the target slope angle, $\alpha$. This relationship may be derived using basic geometry, or by simultaneously solving, through application of the quadratic formula, the sensor rotation circle equation:

$$x^2 + y^2 = r^2 \quad (1)$$

and the target line equation:

$$y = a - x \quad (2)$$

where:
- x = the coordinate location of the sensor 38 relative to the sensor rotation axis 40 along an x-axis defined by a line extending parallel to the rotor axis 46 (i.e., the axial direction);
- y = the coordinate location of the sensor 38 relative to the sensor rotation axis 40 along a y-axis defined by a line extending in the blade row plane perpendicular to the rotor axis 46 (i.e., the tangential direction); and
- $\alpha$ = the y axis intercept of the target 44 at the time of the target passing event (see FIG. 4B).

In addition, the polar coordinate transformation equation $y = R\cos(\Theta)$ may be applied to obtain the following relationship:

$$\text{FTA} = [(r \times 180)(\cos(\Theta) + \sin(\Theta)\cot(\alpha) - 1)]/(\pi \times R) \quad (3)$$

where:
- r = the radius of the sensor circle 42;
- $\Theta$ = the sensor rotation angle comprising the angular displacement of the sensor 38 relative to the positive y-axis;
- $\alpha$ = the target slope angle relative to the blade row plane; and
- R = the radius from the rotor axis 46 to the target 44 at the radial outer end of the blade 14a, see FIG. 1.

Figure 5:
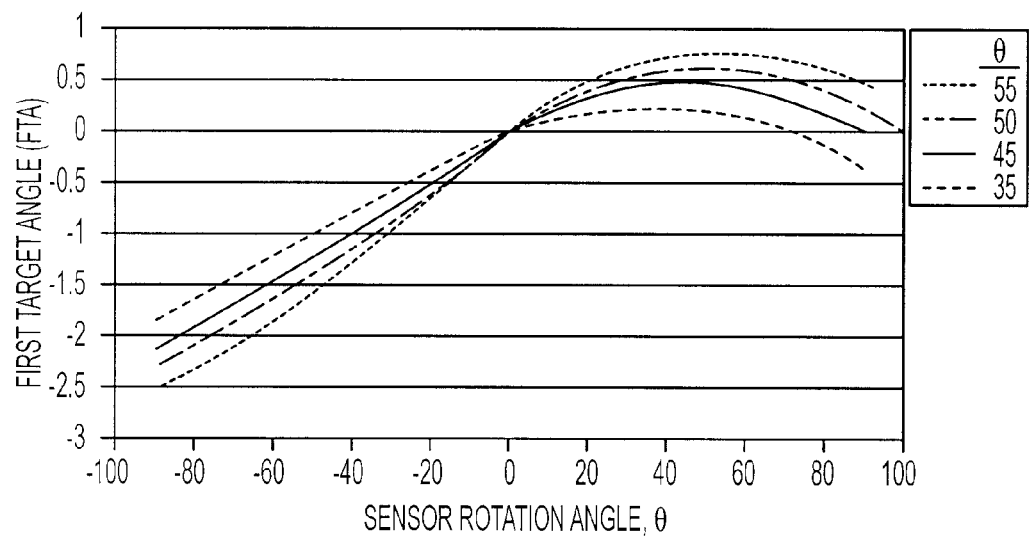
FIG. 5 is a graph illustrating plots of a first target angle versus the sensor rotation angle for different target slope angles.
Figure 6:
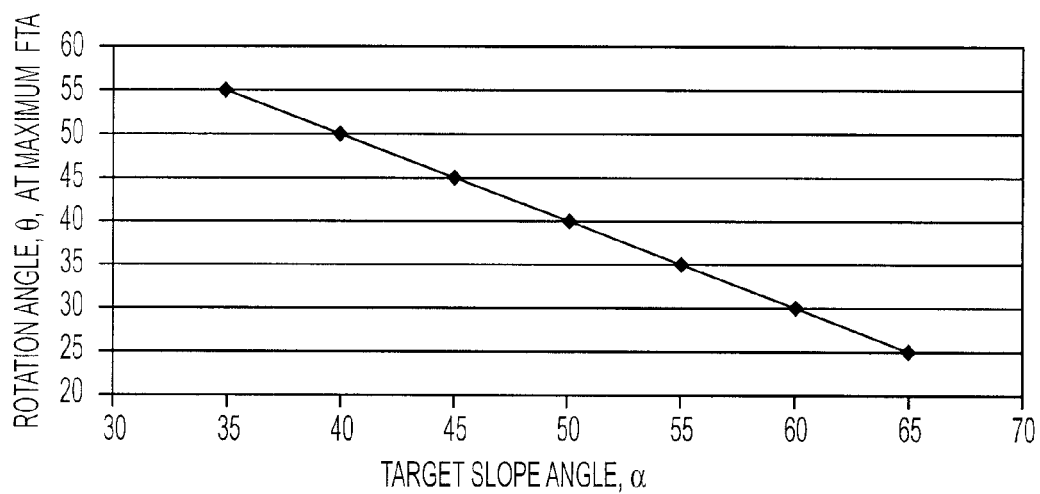
FIG. 6 is a graph of the relationship between the target slope angle and the sensor rotation angle at the maximum first target angle.

FIG. 5 shows plots of the relationship depicted in equation (3) above. This plot illustrates that every target slope angle, $\alpha$, may be represented by a unique curve which may be accurately characterized to approximately 0.005 degree resolution by the BVM 20. The plots depicted in FIG. 5 correspond to target slope angles, $\alpha$, of 35 degrees, 45 degrees, 50 degrees and 55 degrees. The plots of FIG. 5 are characterized by a peak or maximum FTA value of each curve, where the maximum value of each curve occurs at a particular sensor rotation angle, $\Theta$. As seen in FIG. 6, the sensor rotation angle, $\Theta$, at which the maximum value of each curve, i.e., the maximum FTA, in FIG. 5 occurs is linearly related to the target slope angle, $\alpha$.

The relationship depicted in FIG. 6 may also be expressed by the equation:

$$\Theta_{max} = a\tan(\cot(\alpha)). \quad (4)$$

Referring to FIG. 5, it can be seen that the maximum value of the FTA for each curve occurs midway between two points at which the FTA values are equal on a given curve. For example, considering the curve for which $\Theta = 45$ degrees, the FTA value is 0 (crosses the x-axis) at $\Theta_1 = 0$ degrees and at $\Theta_2 = 90$ degrees. Thus, the maximum FTA value may be determined by the relationship:

$$\Theta_{max} = (\Theta_2 - \Theta_1)/2 \quad (5)$$

where $\Theta_2$ and $\Theta_1$ are two sensor rotation angles for which the blade passing events produce the same value for the FTA.

Alternatively, equation (3) may be used to set up two equations for two different sensor rotation angles, $\Theta$, corresponding to the condition where the FTA for a first sensor rotation angle, $\Theta_1$, equals the FTA for a second sensor rotation angle, $\Theta_2$, and solving for the target slope angle, $\alpha$, to provide the following relationship:

$$\alpha = \tan^{-1}[(\sin\Theta_2 - \sin\Theta_1)/(\cos\Theta_1 - \cos\Theta_2)]. \quad (6)$$

Figure 7:
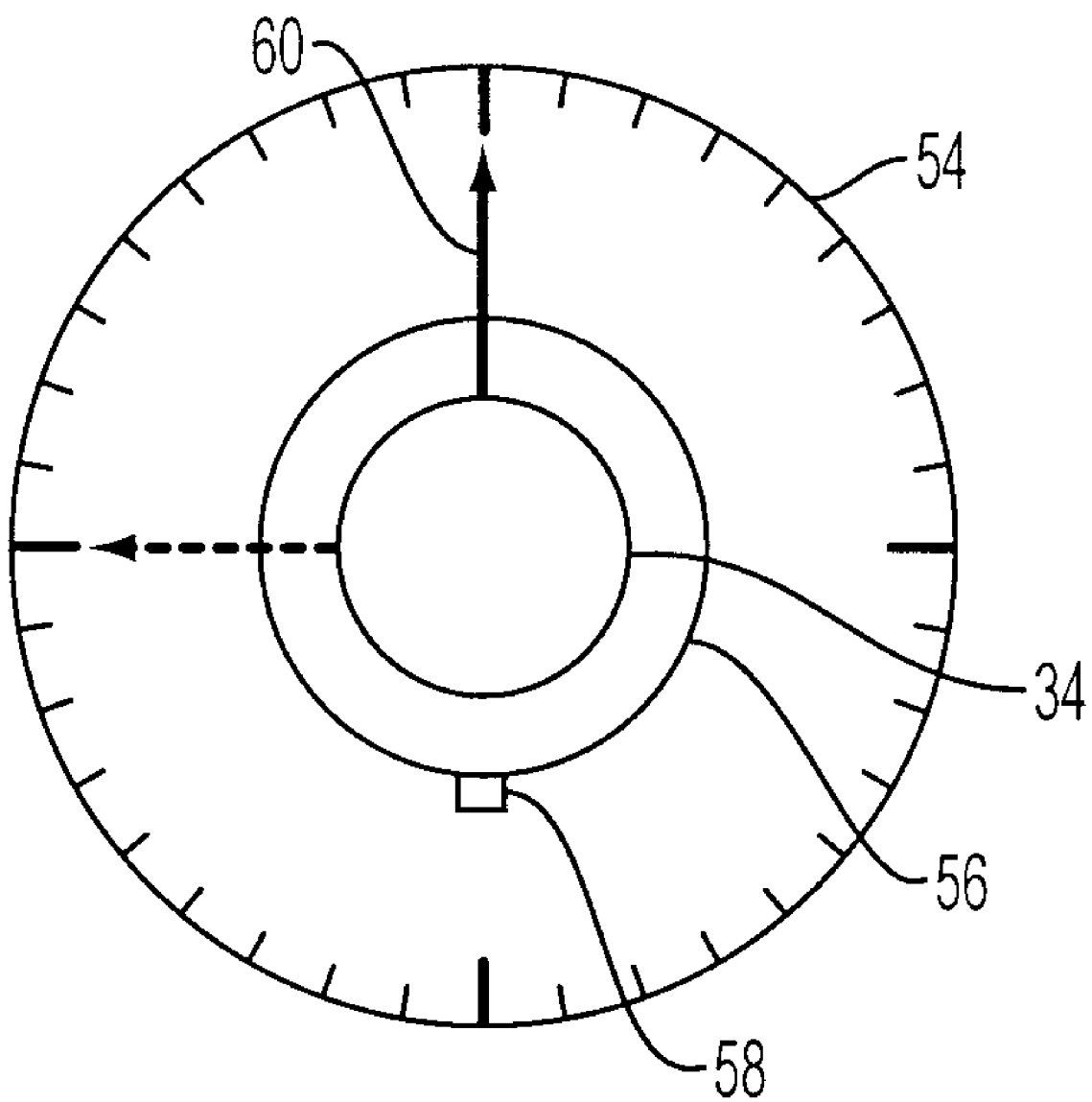
FIG. 7 is a diagrammatic illustration of a protractor arrangement for making manual measurements of the sensor rotation angle.

In a first example of the present method, a technician may attach a mechanical protractor instrument 54 to the sensor probe structure 22, see FIG. 7. For example, a protractor 54 having one degree increments may be provided. The protractor is preferably mounted to a probe shaft 56 extending through and affixed to the turbine wall portion 36. The protractor 54 may be held in a predetermined stationary relationship relative to the probe shaft 56 by a key 58 to maintain a zero position of the protractor 54 aligned in a first, vertical position, corresponding to the location of the positive y-axis in FIGS. 4A and 4B. During a measurement procedure, with the turbine 8 in operation, a pointer 60, keyed to rotate with the probe 34, is initially aligned to the zero position of the protractor 54, corresponding to the position, $P_1$, aligned along the positive y-axis in FIGS. 4A and 4B. The BVM 20 is programmed to provide the FTA as an analog voltage output that may be read by the technician at the probe site using, for example, a handheld voltmeter (not shown). The sensor probe 34 may then be rotated slowly downstream and then upstream around the sensor circle 42, and a plot may be made of the sensor rotation angle, $\Theta$, versus the FTA output by the BVM 20. It should be noted that the sensor 38 is considered to be located over the target 44 as long as the plot matches the form of the plots shown in FIG. 5, and that if the sensor 38 is not over the target 44, the plot will deviate substantially from the plots illustrated in FIG. 5.

As the sensor 38 is rotated to either side from the vertical position $P_1$, the rotation is stopped when the FTA output of the BVM 20 is equal to the initial output measured at position $P_1$. The maximum FTA (MFTA) value is one-half the angular displacement read from the protractor 54, as expressed by equation (5). This MFTA value may then be used with reference to the plot of FIG. 6 to read off the value of the target slope angle, $\alpha$.

In an alternative embodiment for automatically determining the target slope angle, $\alpha$, the probe sensor structure 22 may comprise a motor driven unit 62 for automatically rotating the sensor 38 to predetermined positions under control of the BVM 20. The motor driven structure 62 may comprise a known precession translation instrument such as is currently used with turbine sensors in order to translate the sensors and which provides computer controlled rotation of the probe 34. The procedures described above for manually determining the maximum FTA and for determining the target slope angle, $\alpha$, are performed automatically by the BVM.

It should be noted that the rotational movement of the sensor 38 to perform the processes described above is slow and does not affect the vibration data collected by the sensor 38 for the BVM 20. Hence, the above described embodiments for making measurements of the target slope angle, $\alpha$, may be performed simultaneously with the BVM measurements.

The above described method for determining the target slope angle, α, is particularly useful in monitoring unshrouded blades 14 that untwist due to centrifugal forces as the blades 14 rotate. Although the angle of the target 44 may be known for the stationary condition of the blades 14, the untwisting alters the target slope angle, α, and an accurate determination of the target slope angle, α, for the rotating condition may be obtained using the present invention.

In accordance with a further aspect of the invention, the target slope angle, α, may be used to adjust the position of the sensor 38 to ensure that the target 44 always passes beneath the sensor 38 to produce a target passing event. That is, during operation of the turbine 8, the axial position of the blades 14 along the rotor 16 may shift due to thermal expansion of the rotor 16, and the present method may be used to determine a position for the sensor 38 to generally maintain the sensor 38 over a position of the target 44 that will ensure that a reliable signal 26 is produced corresponding to a target passing event. Further, it should be understood that an accurate determination of the target slope angle α is critical since the BVM measured amplitude is scaled by this target slope angle α.

Referring to FIGS. 4A and 4B, the method of adjusting the sensor 38 to compensate for axial shift of the first blade target 44 comprises determination of the required rotation angle Θ for the probe 34 in order maintain the same sensor/target intercept location, i.e., the location on the target 44 that passes the sensor 38. P₁ corresponds to a sensor/target intercept associated with the target 44' (shown in dotted line) located in an initial position, prior to a rotor shift, and depicted as intercepting a center of the target 44'. As the rotor 16 shifts relative to the turbine casing, depicted by an axial shift b to the left, the target shifts to the left, and is illustrated as a solid line target 44 in a position relative to the sensor/target intercept P₁ for the initial position of the target 44'. It can be seen that the sensor/target intercept is no longer located at the center of the target 44. The first blade target intercept distance increases by a distance c, from the position of target 44 to the position 44', as a result of the axial rotor shift. This shift in the target position is measured by the FTA which can be converted into a first blade target intercept distance by the relationship:

$$c = 2\pi R (FTA/360) \quad (7)$$

where R is the blade tip radius, as described above in relation to equation (3).

Since the distance c, as provided by the measured FTA, is accurately measured by the BVM, and the target angle α has been measured using the methods described above, the rotor shift b can be determined by the relationship:

$$b = c \times \tan(\alpha) \quad (8)$$

Hence, the sensor probe rotation Θ required to produce the same sensor/target intercept for the different axial locations of targets 44 and 44' is described by the relationship:

$$\Theta = \arcsin(b/r) \quad (9)$$

where r is the radius of the sensor circle, as described above in relation to equation (3), see FIG. 4B.

Adjusting the sensor 38 as described above to the same sensor/target intercept results in the FTA, as described above in equation (3), being a substantially constant value. Of course, the present invention may also be used maintain the FTA within a preset range, such as to maintain the sensor/target intercept in generally the same area on the target. In any case, the present method of adjusting the position of the sensor 38 permits the sensor 38 to be relocated to a substantially constant predetermined position along the first blade target with shifts in rotor axial position.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of monitoring a blade structure in a turbine comprising a plurality of radially extending blades mounted on a rotor for rotation about a rotational axis, said blade structure including at least one target portion located at a radially outer location of said blade structure, said method comprising the steps of:
   providing a sensor adjacent said blade structure;
   positioning said sensor at a first location adjacent said blade structure;
   generating a first signal corresponding to a first target passing event sensed by said sensor at said first location;
   positioning said sensor at a second location adjacent said blade structure a known displacement from said first location;
   generating a second signal corresponding to a second target passing event sensed by said sensor at said second location; and
   producing target slope data from said first and second signals and said known displacement of said sensor.

2. The method of claim 1, wherein said target slope data comprises an angle of said at least one target portion relative to a blade plane extending perpendicular to said rotational axis of said rotor.

3. The method of claim 2, wherein said at least one target portion comprises a blade tip of one of said blades, and said target slope data comprises an angle of said blade tip relative to a blade plane extending perpendicular to said rotational axis of said rotor.

4. The method of claim 2, further including the step of using said angle of said at least one target portion as a scaling parameter to determine a location for said sensor whereby said second signal is maintained within a preset range of said first signal with axial displacement of said blade along said rotor.

5. The method of claim 1, wherein said second location is displaced from said first location in a direction generally parallel to said rotational axis of said rotor.

6. The method of claim 5, wherein said sensor is supported for eccentric movement about a sensor circle, and said known displacement between said first and second locations comprises an angular displacement about said sensor circle.

7. The method of claim 6, wherein said first and second signals correspond to time of arrival measurements between a once-per-revolution (OPR) reference pulse signal and said first and second target passing events, respectively.

8. The method of claim 7, wherein said time of arrival measurements comprise a first target angle (FTA) measurement described by the equation:

$$FTA = [(r \times 180)(\cos(\Theta) + \sin(\Theta)\cot(\alpha) - 1)]/(\pi \times R)$$

where:
   r = a radius of said sensor circle;
   Θ = an angular displacement of said second location relative to said first location;
   α = an angle of said at least one target portion relative to a direction of movement of said blade perpendicular to said rotational axis of said rotor; and
   R = a radius from said rotor to said at least one target portion.

9. The method of claim 7, wherein said step of positioning said sensor at said second position comprises:

rotating said sensor about said sensor rotational axis from said first location to a location where said second signal is within a preset range of said first signal.

10. The method of claim 9, wherein said step of producing said target slope data comprises determining an angle, $\alpha$, of said at least one target portion relative to said rotational axis of said rotor using the relationship:

$$\alpha = \tan^{-1}[(\sin \Theta 2 - \sin \Theta 1)/(\cos \Theta 1 - \cos \Theta 2)]$$

where:
$\Theta 1$=a first angle defining said first location of said sensor; and
$\Theta 2$=a second angle defining said second location of said sensor where said second signal equals said first signal.

11. A method of positioning a blade vibration monitor sensor for monitoring a blade structure in a turbine comprising a plurality of radially extending blades mounted on a rotor for rotation about a rotational axis, said blade structure including at least one target portion located at a radially outer location of said blade structure, said method comprising the steps of:

providing a sensor adjacent said blade structure;
moving said sensor between first and second locations relative to said blade structure;
sensing first and second target passing events corresponding to said at least one target passing said sensor at said first and second locations;
generating first and second signals corresponding to said first and second target passing events, respectively; and
compensating for axial displacement of said blade during operation of said turbine by monitoring said second signal and moving said sensor to maintain said second signal within a preset range of said first signal.

12. The method of claim 11, wherein said first and second target signals correspond to time of arrival measurements between a once-per-revolution (OPR) reference pulse signal and said first and second target passing events, respectively.

13. The method of claim 12, wherein said step of compensating comprises using a known angle of said at least one target portion relative to a blade plane extending perpendicular to said rotational axis of said rotor as a scaling parameter to determine said second position for said sensor.

14. The method of claim 13, wherein said sensor is supported for eccentric movement about a sensor circle, and said step of moving said sensor between said first and second locations comprises rotating said sensor about said sensor circle.

15. The method of claim 14, wherein said step of compensating comprises determining a required rotation for said sensor through an angle, $\Theta$, in accordance with the equation:

$$\Theta = \arcsin(b/r)$$

where:
r=a radius of said sensor circle;
b=c×tan($\alpha$);
$\alpha$=an angle of said at least one target portion relative to a direction of movement of said blade perpendicular to said rotational of axis said rotor;
c=$2\pi R \times$(FTA/360);
R=a radius from said rotor to said at least one target portion; and
FTA=a first target angle measured by a blade vibration monitor and corresponding to time of arrival measurements determined from said target passing events.

16. The method of claim 15, including performing an additional step of blade vibration monitoring using signals from said sensor simultaneously with said step of compensating for axial displacement of said blade.

17. The method of claim 15, further including a step of determining said angle, $\alpha$, of said at least one target portion relative to said rotational axis of said rotor using the relationship:

$$\alpha = \tan^{-1}[(\sin \Theta 2 - \sin \Theta 1)/(\cos \Theta 1 - \cos \Theta 2)]$$

where:
$\Theta 1$=a first angle defining said first location of said sensor; and
$\Theta 2$=a second angle defining said second location of said sensor where said second signal equals said first signal.

18. The method of claim 11, wherein said sensor comprises a sensor probe structure including a motor driven unit for effecting rotation of said sensor, and said step of compensating includes the step of automatically actuating said motor driven unit to position said sensor relative to said target in response to a sensed change in said second signal.

* * * * *